United States Patent
McGinty

(10) Patent No.: US 6,755,118 B1
(45) Date of Patent: Jun. 29, 2004

(54) WINE STORAGE ENVIRONMENTAL CONTROL SYSTEM

(76) Inventor: Matthew John McGinty, 19499 Franqelin Pl., Sonoma, CA (US) 95476

( * ) Notice: Subject to any disclaimer, the term of this patent is extended or adjusted under 35 U.S.C. 154(b) by 0 days.

(21) Appl. No.: 10/409,244

(22) Filed: Apr. 7, 2003

(51) Int. Cl.[7] .............................. A23B 4/03; C12H 1/00; C12C 13/00

(52) U.S. Cl. .......................... 99/277.1; 99/476; 99/473; 99/467; 426/231

(58) Field of Search ............................... 99/277.1, 277, 99/467, 476, 473, 468; 426/592, 418, 419, 524, 231, 232, 233, 520

(56) References Cited

U.S. PATENT DOCUMENTS

| | | | |
|---|---|---|---|
| 196,094 A | * | 10/1877 | Johnson .................... 99/277.1 |
| 231,129 A | * | 8/1880 | Wiesebrock ................ 99/277 |
| 709,432 A | * | 9/1902 | Baker ........................ 426/314 |
| 1,938,889 A | * | 12/1933 | Bloom ........................ 99/469 |

\* cited by examiner

*Primary Examiner*—Reginald L. Alexander
(74) *Attorney, Agent, or Firm*—Risto A. Rinne, Jr.

(57) ABSTRACT

A control system for maintaining the temperature and humidity for a wine storage area within a predetermined range and at low operating cost includes a conduit field buried in a sand layer at a depth where the temperature normally ranges from 55 to 57 degrees F. An air intake is preferably disposed on a north side of a new or existing structure and draws outside ambient air into the conduit field when an exhaust fan is on and a partial vacuum is created in the wine storage area. The temperature and humidity of the ambient air are altered, as desired, during its passage through the conduit field until it is discharged in the wine storage area as a conditioned air. A pair of thermostats each individually control operation of the exhaust fan so as to maintain temperature below a first maximum setting and above a second minimum setting.

23 Claims, 2 Drawing Sheets

WINE STORAGE ENVIRONMENTAL CONTROL SYSTEM

BACKGROUND OF THE INVENTION

1. Field of the Invention

The present invention, in general relates to wine cellars and, more particularly, to a system to maintain the environment of a wine storage area.

When wine is placed in barrels or bottles for storage and/or fermentation it is important to control the temperature and humidity of the environment by maintaining both temperature and humidity within a predetermined range.

An ideal range for relative humidity is from 74% to 80%. If the humidity is less, evaporation loss of the wine that is stored in the barrels increases and can become excessive and costly. It is reported, for example, that wine loss due to evaporation can typically approach a volume of 8%. If this amount could be halved, for example to 4% loss due to evaporation, many millions of dollars would be saved each year (i.e., the value of the saved wine).

Conversely, an excessively high level of humidity can cause the labels that are on wine bottles (also used in storage) to come off and can also contribute to the unwanted formation of mold and mildew as well as bacterial formation.

An ideal range for temperature is from 52 to 66 degrees, Fahrenheit. Other temperatures do not promote optimum fermentation over time.

People have learned how to adapt basement areas into wine cellars. Still, to maintain the temperature at a desirable level in a wine cellar can be difficult and costly as such maintenance relies upon energy intensive methods of heating, humidifying, dehumidifying, and air conditioning the wine cellar.

Also, there are limited options for cellars. The water table cannot be too high and the size of the cellar is often limited to the size of the structure that rests above it.

Previous attempts to increase humidity levels rely upon spray emitters but the use of these types of devices tend to contribute to the formation of rot of the wood in the building or the rusting of the structure. Spray emitters also tend to increase the likelihood and severity of any mold or mildew problem.

The use of free standing above ground structures is generally not considered practical for wine cellars because the temperature and humidity cannot be controlled without great energy consumption and therefore, great cost.

The use of caves, both natural and man-made, while offering some promise have been shown to have significant problems relating to the creation of an excessively damp environment. In particular, water intrusion into caves is a problem. Even a small amount of water intrusion can form puddles. The puddles stagnate for a long period of time as the water does not soon evaporate. This promotes the growth of bacteria and can lead to a hazardous or toxic environment for humans to enter. Excessive moisture also promotes the growth of mold, which is also undesirable and even hazardous. To solve this problem, wineries may open access doors to caves, thereby losing the ability to economically maintain the temperature and humidity level in the environment. As such, caves have not demonstrated the energy savings that were anticipated to occur.

It is desirable to economically control the environment in either an above ground structure or a below ground structure, such as a cave, so that wine may be placed for fermentation and storage therein. It is also desirable to be able to retrofit such a system into a pre-existing type of structure (i.e., any above or below ground structures).

Accordingly, there exists today a need for a wine storage environmental control system that is useful in economically controlling the environment.

Clearly, such a system would be useful and desirable.

2. Description of Prior Art

Wine cellars and caves are, in general, known. While the structural arrangements of the above described devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a wine storage environmental control system that can be used in an above-ground structure.

It is also an important object of the invention to provide a wine storage environmental control system that can be used in a below-ground structure.

Another object of the invention is to provide a wine storage environmental control system that can be used in a cave.

Still another object of the invention is to provide a wine storage environmental control system that uses geothermal energy to regulate the temperature and humidity in the environment.

Still yet another object of the invention is to provide a wine storage environmental control system that can be retrofitted to an existing structure.

Yet another important object of the invention is to provide a wine storage environmental control system that is economical to operate.

Still yet another important object of the invention is to provide a wine storage environmental control system that is reliable to operate.

A first further important object of the invention is to provide a wine storage environmental control system that can be scaled to work with any size structure (i.e., any volume of space).

A second further important object of the invention is to provide a wine storage environmental control system that can be used to heat an environment where wine is stored.

A third further important object of the invention is to provide a wine storage environmental control system that can be used to cool an environment where wine is stored.

A fourth further important object of the invention is to provide a wine storage environmental control system that can be used to affect the relative humidity level of an environment where wine is stored.

Briefly, a wine storage environmental control system that is constructed in accordance with the principles of the present invention has a network of conduit buried in a sand layer. An intake is provided on a north side and allowed to vent into the environment proximate a quantity of barrels. A first thermostat is located above the highest barrel (or bottle) and is set to turn a venting exhaust fan on if the temperature exceeds a predetermined maximum, typically 64 degrees.

Where the exhaust fan is on, air inside of the structure is exhausted to the outside. This creates a partial vacuum within the structure which tends to draw outside air in through the conduit where the air is cooled (typically in the summer) and warmed (typically in the winter) and which tends to raise the moisture content of the air as it traverses the network of conduit, thereby increasing the relative humidity of the outside air to a desired level prior to exiting as a conditioned air from the conduit into the structure. When a predetermined minimum temperature is attained, the venting exhaust fan is turned off by the first thermostat. A second thermostat is located approximately forty-two inches above the level of the floor. When the temperature drops below a predetermined minimum, for example 55 degrees (i.e., when the ambient air in the structure becomes too cool), the second thermostat turns the exhaust fan on to again draw outside air in through the conduits where it is warmed and exhausted as the conditioned air into the structure. When a predetermined maximum temperature is attained, the exhaust fan is turned off by the second thermostat. Accordingly, the temperature and humidity are maintained within a predetermined range year-round and at a very low energy cost.

DETAILED DESCRIPTION OF THE INVENTION

Figure 1:
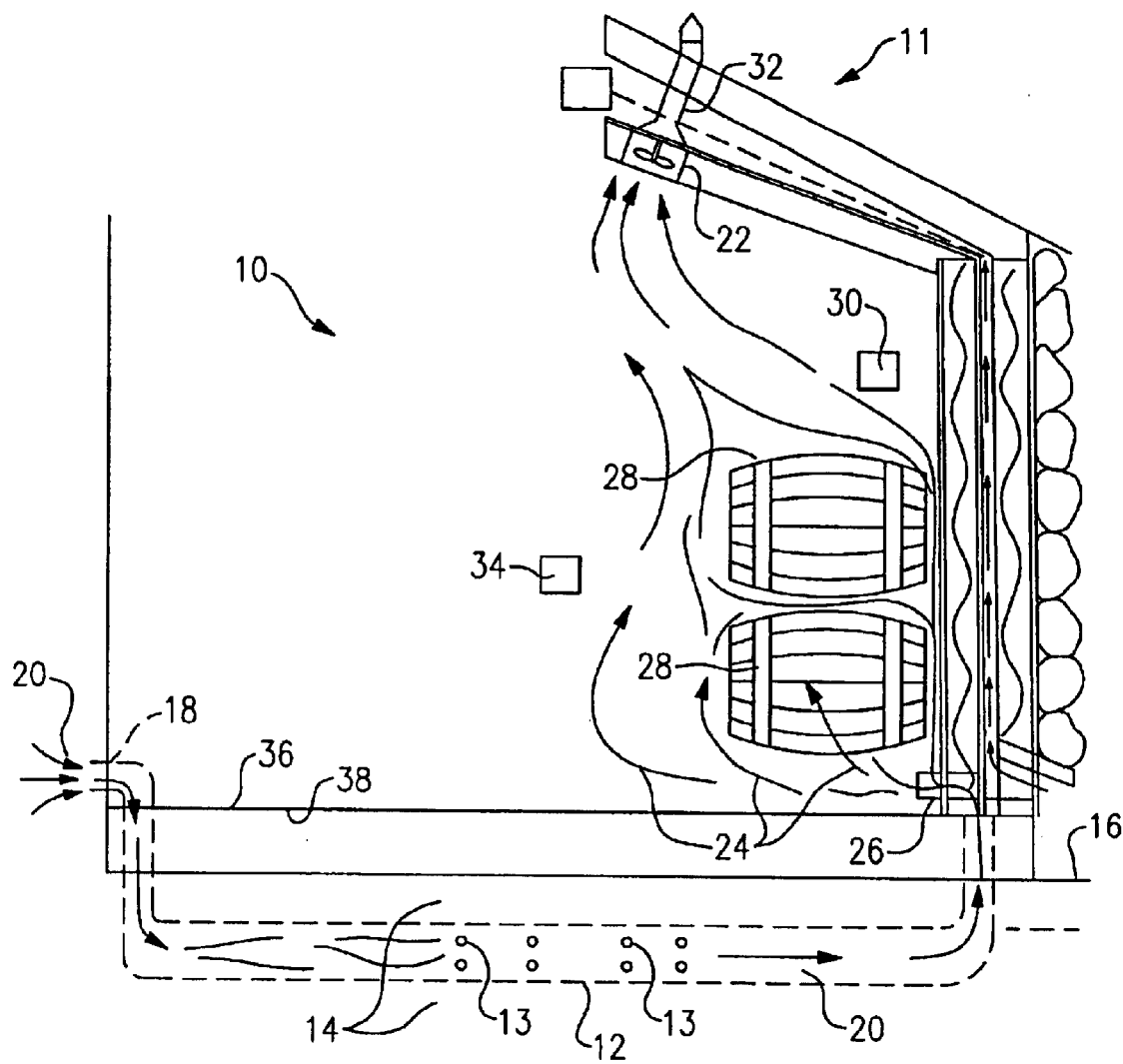
FIG. 1 is a cross-sectional view of a wine storage environmental control system in an above ground structure.

Referring to FIG. 1 is shown, a wine storage environmental control system, identified in general by the reference numeral 10. The wine storage environmental control system 10, as shown, is adapted for use in an above-ground type of structure, identified in general by the reference numeral 11.

A plurality of conduits 12 are buried in a layer of sand 14 a predetermined distance below an outside grade level 16. The depth that is chosen is a function of the temperature in the soil. For new construction, as shown in FIG. 1, the conduit 12 is preferably disposed under the structure 11 at an ideal depth, as is discussed in greater detail hereinbelow. For retrofit construction, the conduit 12 is disposed adjacent to or away from such existing types of structure (see FIG. 2) as is discussed in greater detail hereinafter.

Figure 2:
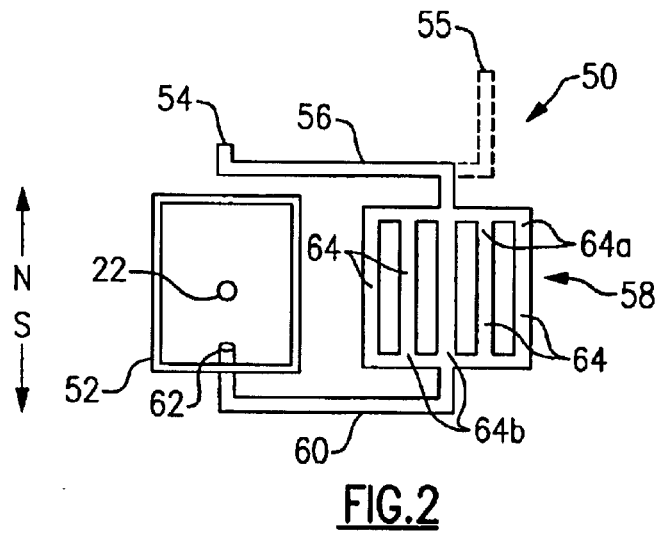
FIG. 2 is a block diagram of a modified wine storage environmental control system used in retrofit situations where the conduit is located remote from the storage area.

It is also important to note that for the purpose of illustration, only one length of the conduit 12 is shown in the FIG. 1 illustration, however the conduit 12 will typically include many connected sections of the conduit 12 so as to form a conduit field, as is discussed in greater detail hereinafter and as shown in FIG. 2.

Preferably, a temperature of from 55 degrees F. to 57 degrees F. is found in the soil. If the soil includes a sandy soil having a sufficient quantity of the desired sand 14, the conduit 12 is placed in the sandy soil at the desired depth.

If the soil is not sufficiently sandy, the soil is excavated further and the sand 14 is deposited in the excavated area until it is at depth to where the top of the sand that is deposited is at an elevation that previously was at the desired temperature range (i.e., from 55–57 degrees). Then the conduit 12 is placed on top of the sand 14 and an additional layer of the sand 14 is placed over the conduit 12 so as to bury it in the sand 14.

The construction of the conduit 12 is described in greater detail hereinafter. As mentioned above, the depth of the conduit 12 is determined by the temperature of the soil and, accordingly, the conduit 12 can be located a relatively short distance below the grade 16 (providing the temperature is stable year round) or it may be disposed many feet below the grade 16, as required.

An air intake 18 is provided on a north side of the structure 11 and is operably connected to the conduit 12. As shown, a portion of the air intake 18 enters into the structure 11 and then goes beneath the structure to connect with the conduit 12. This is preferred although it is possible to direct an alternative type of an air intake (not shown) that does not actually enter into the structure 11 but passes under it or around it. This is especially useful in retrofit applications and is discussed in greater detail hereinafter (see FIG. 2).

Outside air 20 having a particular temperature and humidity enters the air intake 18 whenever an exhaust fan 22 is on. When the exhaust fan 22 is on, a partial vacuum is formed inside the structure 11 which draws the outside air 20 in through the air intake 18 and into the conduit 12.

It is of course possible to modify the wine storage environmental control system 10 so as to include an optional fan (not shown) that is placed in-line with the air intake 18 or the conduit 12 and which is adapted to force outside air 20 into the structure 11.

It is preferable to locate the air intake 18 on the north side of the structure 11, so as to ensure that it is in the shade. Accordingly, optimally cool outside ambient air is being drawn into the air intake 18 in the summer which helps to cool an interior volume of the structure 11.

In the winter, when heated air is required, the north side location is not a detriment as only a small temperature increase is usually required to maintain the proper temperature in the structure 11. This is because those areas in which grapes are grown and used for the production of wines do not tend to experience excessively cold winters.

Accordingly, the energy demand and therefore also the cost of cooling the structure 11 in the summer is apt to be more burdensome, generally, than heating it in the winter.

The outside air 20 enters the conduit 12 and, as it passes through the conduit 12, its temperature may be affected (depending upon the temperature of the outside air 20 as compared with the temperature of the sand 14 around the conduit 12). If the temperature of the outside air 20 is the same as the temperature of the sand 14 surrounding the conduit 12, then the temperature of the outside air 20 is not affected by its passage through the conduit.

In this particular example, let us assume that the outside air 20 is at a higher temperature than the sand 14 in the conduit 12. This could be representative of usage of the wine storage environmental control system 10 in the summer, although such a condition can certainly occur during warmer winter days as well. Accordingly, the outside air 20 is cooled as it passes through the conduit 12. As it is cooled, its relative humidity also automatically increases.

This is because the amount of moisture that was present in the outside air 20 as it initially entered the air intake 18 also remains. As the outside air 20 is cooled, its capacity to hold moisture decreases. For any given quantity of moisture initially present in the outside air 20 as it is cooled to a lower temperature this provides a higher relative humidity. Condensation can also occur inside the conduit 12 as well, and the outside air 20 picks up moisture from the condensation.

If the outside air 20 does not generally have a sufficient amount of moisture (i.e., relative humidity) then as desired, the conduit 12 can include a plurality of small openings 13 therein that permit moisture in the sand 14 to humidify the outside air 20 as it passes inside of the conduit 12 and yet which tends to resist the incursion of the sand 14 into the conduit 12. For example, the openings 13 can be disposed so as to point in a downward direction.

After the outside air 20 has passed through the entire length of the conduit 12 (there are typically a plurality of parallel conduit 12 paths) it will have had its temperature and likely its humidity altered (providing the outside air was at a different temperature than the sand 14).

Continuing with the example in which the outside air 20 is initially warmer than is the sand 14, then after the air 20 has passed through the conduit 12 and has been cooled (and its humidity increased), a conditioned air 24 is discharged from the conduit 12 through a discharge vent 26 and into an interior space within the structure 11.

The discharge vent 26 is preferably located proximate a plurality of barrels 28 that contain a wine. Bottles or other types of containers (not shown) can, of course, be substituted for the barrels 28.

A plurality of discharge vents (not shown in this illustration) and intake vents (not shown in this illustration), all connected to a matrix of the conduit 12 (not shown in this illustration) are anticipated for use and are varied (i.e., scaled in size and quantity) according to the interior volume of the structure 11 and also according to other factors, for example, the insulation value, or R value, of the structure 11 or the average daily mean temperature of the outside air 20 or the average daily mean relative humidity level.

A first thermostat 30 is located above the highest barrel (or bottle) and is set to turn the exhaust fan 22 on if the temperature exceeds a predetermined maximum, typically 64 to 66 degrees. The exhaust fan 22 provides a vent through which the air inside of the structure 11 is exhausted to the outside.

Depending upon variations in the design of the structure 11, a section of exhaust conduit 32 may be attached to the exhaust fan 22 intermediate the fan 22 and the exterior ambient air.

Preferably, the exhaust fan 22 is located at or near the highest interior point within the structure 11. This promotes a more complete air exchange. The exhaust conduit 32 is also located so as to discharge the air from inside of the structure 11 at a distal location with respect to the air intake 18. This ensures that the discharged air will not in any way adversely affect the quality of the outside air 20 that is simultaneously being drawn into the conduit 12.

Whenever the exhaust fan 22 is on, air inside of the structure 11 is exhausted. This then creates a partial vacuum in the structure 11 which tends to draw the outside air 20 in through the conduit 12 where it is cooled and humidified, according to the current example.

When a predetermined minimum temperature inside the structure 11 is attained, preferably around 58–60 degrees, the venting exhaust fan 22 is turned off under control of the first thermostat 30.

There is a preferred location for the first thermostat 30 that is approximately 12 inches above the highest barrel 28 (i.e., container) in the structure 11. The first thermostat 30 in cooperation with the rest of the wine storage environmental control system 10 prevents the temperature in the structure 11 from becoming excessively warm by maintaining the temperature within the desired range, for example from 58 to 66 degrees F.

A second thermostat 34 is located approximately forty-two inches above the level of a floor 36. A concrete slab 38 is placed over the sand 14, the too surface of which provides the floor 36.

When the temperature in the structure 11 drops below a predetermined minimum, for example below 55 degrees, the second thermostat 34 turns the exhaust fan 22 on to again draw outside air 20 in through the conduit 12 where it is now warmed and discharged into the structure 11 as the conditioned air 24.

The second thermostat 34 can be set to turn on when the temperature is within a range of from 52 to 58 degrees F., as desired. When a predetermined maximum temperature is attained, the exhaust fan 22 is turned off by the second thermostat 34. The maximum temperature should not exceed 66 degrees F. An ideal range is from 55 degrees to 62 degrees F.

Referring now to FIG. 2, is shown a block diagrammatic view (i.e., looking down from the top) of a first modified wine storage environmental control system, identified in general by the reference numeral 50.

A modified structure 52 is preexisting and the first modified wine storage environmental control system 50 is to be retrofitted for use with the preexisting modified structure 52. The preexisting structure 52 could be any above-ground or below ground or partially below ground (i.e., basement, cellar, cave, or other type of subterranean volume) preexisting area.

A modified air intake 54 is preferably located at a north side of the modified structure 52. A length of connecting conduit 56 is used to connect the modified air intake 54 with a modified plurality of conduit 58 that is disposed away from the modified structure 52. A modified second air intake 55 shown in dashed lines may also be used as can any number of additional modified air intakes (not shown).

A second length of connecting conduit 60 connects the an output side of the modified conduit 58 with a modified discharge vent 62 through which the conditioned air 24 is discharged into an interior space within the structure 11.

Location and functioning of the first and second thermostats 30, 34 and the exhaust fan 22 are as previously described.

The modified conduit 58 includes a plurality of conduit paths 64 that have a common (i.e., operably connected) input side 64a and a common output side 64b. The conduit paths 64 may be parallel or not, as desired.

The conduit paths 64, taken together, form a conduit field having a particular sum total of length and occupying a particular area (as viewed from the top). The diameter, depth, spacing, length, or any other variable of any of the conduit paths 64 is determined by sizing the conduit paths 64 to match the needs of the modified structure 52 (i.e., its size and attributes as well as its R value) and the geographical environment in which the modified structure 52 is located.

The connecting conduit 56 and the second length of connecting conduit 60 are preferably disposed at an ideal depth (i.e., where the temperature is from 55–57 degrees F.) in the ground and are surrounded by the sand 14, the same as with all of the modified conduit 58.

The modified conduit 58 can be located as close to or as far away from the modified structure 52 as desired. It can include as much or as little of the modified conduit 58, the connecting conduit 56, and the second length of connecting conduit 60 as is determined to be necessary. Similarly, the rate of air flow through the exhaust fan 22 is selected to match the size of the conduit field so as to ensure optimum function of the first modified wine storage environmental control system 50.

The use of the modified conduit 58 allows it to be sized for use with any type of a modified structure 52. Accordingly, the first modified wine storage environmental control system 50 can be adapted for use with any preexisting modified structure 52.

It is important to note that all of attributes necessary to form the conduit field for the modified structure 52 apply equally well to the structure 11 of FIG. 1. The conduit 12 of FIG. 1 includes a similar type of "sized field" of conduit 12 based on all of the variable of the application at hand.

In such a situation (i.e., with new construction), the conduit field may be disposed entirely under the structure 11 or it may be partially disposed under the structure 11 and partially adjacent thereto, or it may be partially disposed under the structure 11 and partially disposed a predetermined distance away from the structure 11 or it may be entirely disposed away from the structure 11.

The location chosen for the conduit field for any application utilizing the wine storage environmental control system 10 or the first modified wine storage environmental control system 50 (or any other version thereof) is determined largely by soil analysis. An ideal temperature and humidity and type of soil are preferred and if these soil attributes are located away from the structure 11 then the site selected for the conduit field may well be away from the structure 11, as desired.

Operation and benefits of the first modified wine storage environmental control system 50 are essentially the same as that described for the wine storage environmental control system 10.

Figure 3:
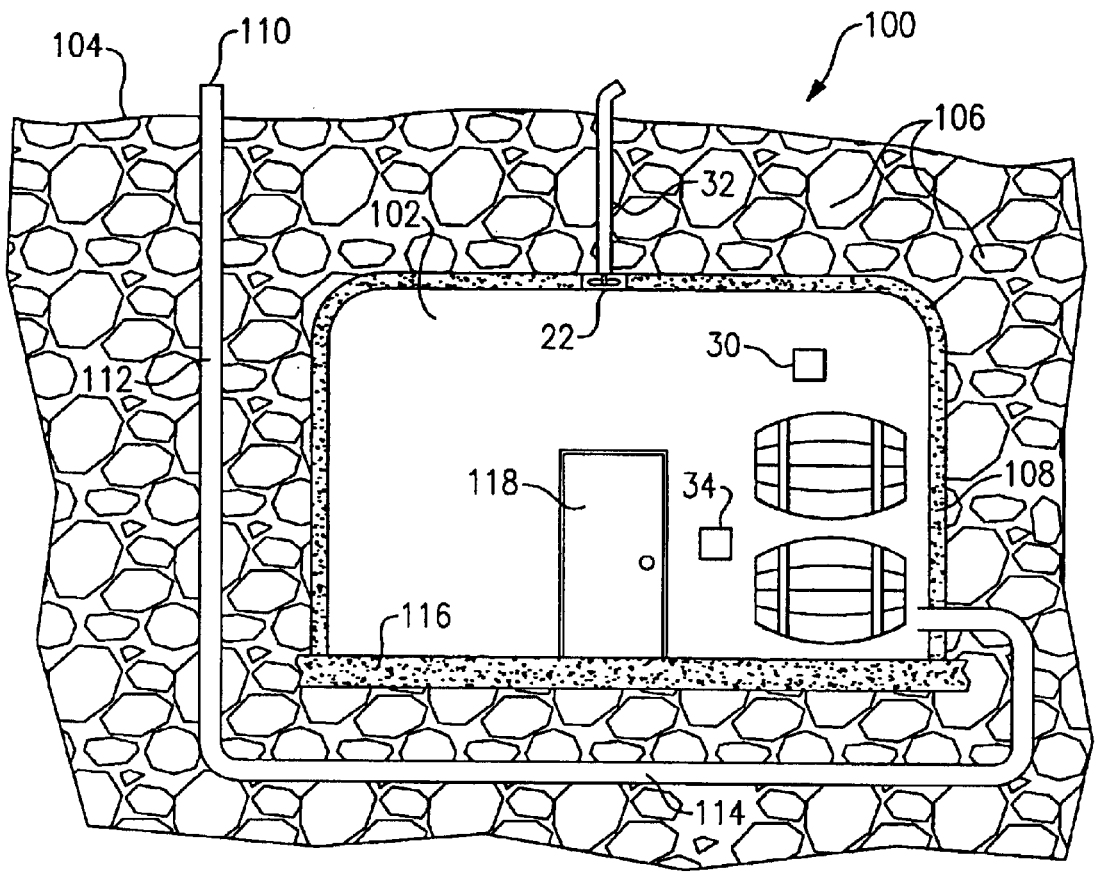
FIG. 3 is a cross-sectional view of a further modified wine storage environmental control system used in a cave.

Referring now to FIG. 3 is shown a cross-sectional view of a second further modified wine storage environmental control system 100 for use in a cave 102.

The cave 102 can be a preexisting area or a newly excavated one specifically designed to implement the second further modified wine storage environmental control system 100.

The cave 102 is disposed a predetermined distance under a grade level 104. The cave 102 is surrounded by a material 106, either soil or rock. A man-made reinforcement material 108 that is adapted to provide structural integrity of the cave 102 may be included if the surrounding material 106 is not sufficiently capable of providing the necessary strength for the cave 102. The man-made material 108 is selected as needed and is well known in the cave making arts.

A second modified air intake 110 draws air in from above the grade level 104 through a vertical conduit 112 and down into a modified conduit field 114. The modified conduit field 114 is shown below a floor 116 of the cave 102 although it can be disposed at any desired depth adjacent to or away from the cave 102, as has been previously described.

An exit path includes a door 118 to allow entry or exit from the cave 102. The floor 116 preferably includes a concrete slab, but could be otherwise, if desired.

Operation of the second further modified wine storage environmental control system 100 is essentially the same as that described for the wine storage environmental control system 10. The benefits not previously available are the precise regulation of temperature and humidity in the cave 102 at low cost (only the occasional electrical cost of the exhaust fan 22). As such, the problems of excessive humidity, water intrusion, mold and mildew, as well as bacterial formation are greatly reduced by the second further modified wine storage environmental control system 100.

All of the systems 10, 50, 100 herein described are adapted to typically maintain the temperature within a range of from 58 to 66 degrees Fahrenheit and to maintain the relative humidity within a range of from 74 to 80 percent RH. The exhaust fan 22 draws very little power because it typically has a low volume of air movement in cubic feet per minute.

It is also possible to include a modification in which the exhaust fan 22 is either down-sized or eliminated and convective air currents are utilized to passively regulate the temperature and humidity.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A wine storage environmental control system for use in a structure adapted for the storage of a quantity of wine, comprising:

(a) a length of conduit disposed in a soil at a depth wherein an ambient soil temperature is within a predetermined range;

(b) an air intake adapted for an intake of outside ambient air, said air intake operably connected to a first end of said length of conduit;

(c) an air discharge adapted for a discharge of air from a second end of said length of conduit, said air discharge disposed in said structure;

(d) an exhaust fan disposed in said structure and adapted to exhaust a quantity of said interior air to a location that is external with respect to said structure;

(e) a first thermostat that is operably attached to said exhaust fan said first thermostat being adapted to turn said exhaust fan on when said air temperature in said structure exceeds a predetermined maximum level and wherein said first thermostat is adapted to remain on until said temperature in said structure falls to a predetermined level that is less than said predetermined maximum level;

(f) a second thermostat that is operably attached to said exhaust fan said second thermostat being adapted to turn said exhaust fan on when said air temperature in said structure falls below a predetermined minimum level and wherein said second thermostat is adapted to remain on until said temperature in said structure rises to a predetermined level that is greater than said predetermined minimum level; and (g) wherein when said exhaust fan is on, said ambient outside air is drawn through said air intake and length of conduit and is discharged through said discharge vent into said structure as a conditioned air having a temperature and humidity within a predetermined range.

2. The wine storage environmental control system of claim 1 wherein said structure includes an above-ground structure.

3. The wine storage environmental control system of claim 2 wherein said above-ground structure includes a new construction structure.

4. The wine storage environmental control system of claim 2 wherein said above-ground structure includes a preexisting structure.

5. The wine storage environmental control system of claim 1 wherein said structure includes a structure that is at least partially disposed below ground.

6. The wine storage environmental control system of claim 5 wherein said structure that is at least partially disposed below ground includes a wine cellar.

7. The wine storage environmental control system of claim 5 wherein said structure that is at least partially disposed below ground includes a basement.

8. The wine storage environmental control system of claim 5 wherein said structure that is at least partially disposed below ground includes a cave.

9. The wine storage environmental control system of claim 5 wherein said structure that is at least partially disposed below ground includes a preexisting structure.

10. The wine storage environmental control system of claim 5 wherein said structure that is at least partially disposed below ground includes a new construction structure.

11. The wine storage environmental control system of claim 1 wherein said predetermine range of said ambient soil temperature is not less than 55 degrees Fahrenheit nor more than 57 degrees Fahrenheit.

12. The wine storage environmental control system of claim 1 wherein said soil in which said length of conduit is disposed includes a layer of sand.

13. The wine storage environmental control system of claim 12 wherein said length of conduit includes a plurality of openings intermediate a circumference thereof and said layer of sand.

14. The wine storage environmental control system of claim 1 wherein said air intake is disposed on a north side of said structure.

15. The wine storage environmental control system of claim 1 wherein said air discharge is disposed proximate a lower level of a quantity of wine disposed in said structure.

16. The wine storage environmental control system of claim 1 wherein said exhaust fan is disposed proximate a top portion of an interior of said structure.

17. The wine storage environmental control system of claim 1 wherein said first thermostat is adapted to turn said exhaust fan on when said air temperature in said structure exceeds 64 degrees Fahrenheit and wherein said first thermostat is adapted to remain on until said temperature in said structure falls to a level of 58 degrees Fahrenheit.

18. The wine storage environmental control system of claim 1 wherein said first thermostat is disposed twelve inches above a highest quantity of wine in said structure.

19. The wine storage environmental control system of claim 1 wherein said second thermostat is adapted to turn said exhaust fan on when said air temperature in said structure falls to a level that is below 52 degrees Fahrenheit and wherein said first thermostat is adapted to remain on until said temperature in said structure rises to a level of 66 degrees Fahrenheit.

20. The wine storage environmental control system of claim 1 wherein said second thermostat is disposed 42 inches above a floor of said structure.

21. The wine storage environmental control system of claim 1 wherein said length of conduit is scaleable to accommodate an interior volume of said structure.

22. The wine storage environmental control system of claim 1 wherein said length of conduit includes a plurality of conduit paths that are operable attached to each other and which form a conduit field.

23. A method for regulating the temperature and humidity in a structure adapted for the storage of a quantity of wine, comprised of the steps of:

(a) providing a length of conduit disposed in a soil at a depth wherein an ambient soil temperature is within a predetermined range;

(b) providing an air intake adapted for an intake of outside ambient air, said air intake operably connected to a first end of said length of conduit;

(c) providing an air discharge adapted for a discharge of air from a second end of said length of conduit, said air discharge disposed in said structure;

(d) providing an exhaust fan disposed in said structure and adapted to exhaust a quantity of said interior air to a location that is external with respect to said structure;

(e) providing a first thermostat that is operably attached to said exhaust fan, said first thermostat being adapted to turn said exhaust fan on when said air temperature in said structure exceeds a predetermined maximum level and wherein said first thermostat is adapted to remain on until said temperature in said structure falls to a predetermined level that is less than said predetermined maximum level;

(f) providing a second thermostat that is operably attached to said exhaust fan said second thermostat being adapted to turn said exhaust fan on when said air temperature in said structure falls below a predetermined minimum level and wherein said second thermostat is adapted to remain on until said temperature in said structure rises to a predetermined level that is greater than said predetermined minimum level;

(g) wherein when said exhaust fan is on, said ambient outside air is drawn through said air intake and length of conduit and is discharged through said discharge vent into said structure as a conditioned air having a temperature and humidity within a predetermined range;

(h) turning said exhaust fan on when said air temperature in said structure exceeds said predetermined maximum level and retaining said exhaust fan on until said air temperature falls to said level that is less than said predetermined maximum level; and (i) turning said exhaust fan on when said air temperature in said structure falls below said predetermined minimum level and retaining said exhaust fan on until said air temperature rises to said level that is greater than said predetermined minimum level.

* * * * *